United States Patent Office 3,645,884
Patented Feb. 29, 1972

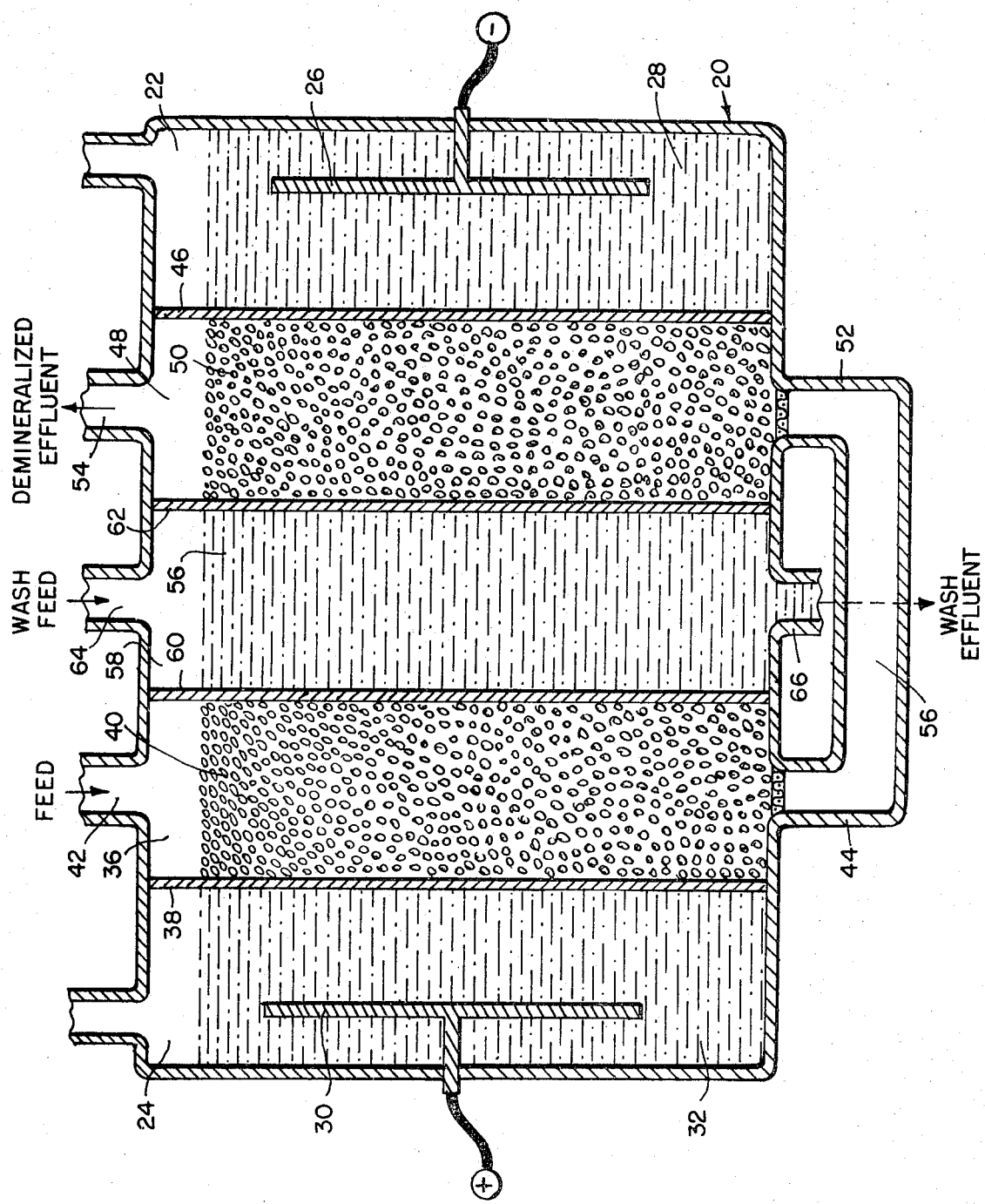

3,645,884
ELECTROLYTIC ION EXCHANGE APPARATUS
Edwin R. Gilliland, 95 Longmeadow Road,
Belmont, Mass. 02178
Filed July 10, 1969, Ser. No. 840,763
Int. Cl. B01d 13/02; C02b 1/82
U.S. Cl. 204—301                                   5 Claims

ABSTRACT OF THE DISCLOSURE

The invention is directed to an ion-selective membrane-electrodialysis apparatus employing a filler of ion-exchange resin in certain chambers of said apparatus for the purpose of deionizing solutions while simultaneously electrolytically regenerating said ion-exchange material.

---

This invention relates to ion-exchange phenomena and more particularly to the electrolytic regeneration of ion-exchange beds.

The principles of deionizing a solution by passage thereof through a bed of ion-exchange resins is well known. The reaction in the bed which removes certain ions, for instance magnesium, calcium, sodium, or the like, from the solution is reversible and the exhausted resin can be regenerated. Hitherto, the regeneration of the resins has been accomplished with moderate concentrations of strong acids where the exchange resin is cationic or with, for instance, ammonia and caustic, where the exchange resins are anionic. Regeneration is not only important from the standpoint of reuse of the resins but, for instance, where anion beds are being used, residual acid is often left in the bed by incomplete regeneration. A similar problem is observed with cationic beds. It has also been shown in the prior art that regeneration can occur electrolytically. A granular cation-exchange resin in the salt form is convertible to the acid form by electrolysis in contact with an inert anode; and similarly an anion exchanger in the salt form is convertible to the basic condition by utilizing a reaction where hydrogen is liberated at the cathode. This has been accomplished in both single polarity types of beds as well as mixed beds, both with and without permselective membranes.

However, in the use of electrical energy for ion-bed regeneration, difficulties are encountered in the actual operations. In most cases, the voltage required is relatively high and the percent regeneration of the bed is quite low. This is undoubtedly due to the type of action involved in such regeneration. After a short period of operation the solution around the ion-exchange resin becomes depleted in ions and has a high resistance even while the resin particles themselves contain large quantities of ions. The conductivity through the resin particles remains good, but the particle-to-particle conductivity is very low. It is therefore apparent that one of the major difficulties in electrolytic regeneration of ion-exchange systems lies in the difficulty in supplying a source of ions to replace those that are on the resin. Generally, replacement with hydrogen of hydroxyl ion is desired, but the concentration of these in the surrounding water becomes very low.

The present invention therefore contemplates as its principal object a method and apparatus whereby electrolytic regeneration of ion-exchange beds is rendered practicable. Other objects are to provide an apparatus of the type described having a ready source of ions available for electrolytic regeneration of ion-exchange resins. Yet another object of the present invention is to provide a multi-compartmented device wherein resins of different types are kept separated, the cation resins being situated between cation membranes and the anion resins between anion membranes, such compartments being placed in alternate series between two electrodes with a flushing chamber between each pair of chambers containing resins of different types.

Other objects of the invention will in part be obvious and will in part appear hereinafter. The invention accordingly comprises the process involving several steps and the relation and order of one or more of such steps with respect to the others, an apparatus possessing the construction, combination of elements and arrangement of parts which are exemplified in the following detailed disclosure, and the scope of the application which will be indicated in the claims.

For a fuller understanding of the nature and objects of the invention reference should be had to the following detailed description taken in connection with the accompanying drawing in which is shown a schematic, side elevational view, in section, of one embodiment of the apparatus of the invention.

Generally the present invention contemplates a method and an apparatus for electrolytically regenerating an ion-exchange system. The apparatus of the invention generally comprises a plurality of adjacent chambers, the end chambers respectively having disposed therein an anode in an anolyte or ready source of cations, such as hydrogen ions, and a cathode in a catholyte or ready source of anions, such as hydroxyl ions. The end chambers may contain vents (not shown) for removal of any gases which may be generated at the electrodes. Disposed immediately adjacent the anode compartment is a cationic-resin compartment having disposed therein a bed of cation-exchange material. Immediately adjacent the cathode compartment is a compartment containing anion-exchange resin. Between the two resin containing compartments is yet another or flushing compartment which will be described hereinafter. In the preferred embodiment, the compartment containing the cation-exchange resin is separated from the flushing compartment and the anode compartment by cation permselective membrane. Similarly, the compartment containing the anion-exchange resin is separated from the cathode compartment and the flushing compartment by anion-permselective membranes. Alternately the permselective membranes may be substituted with porous diaphragms or separators such as synthetic plastic cloth or screens such as Dynel etc. The invention also includes means for introducing a solution intended to be demineralized into one portion of one of the resin filled chambers, for instance, the chamber containing cation-exchange resins so that the solution can be passed through the exchange bed. Means are also provided for passing the effluent from the first ion-exchange bed to a portion of the compartment containing the other ion-exchange resin so that the effluent of the first resin filled compartment is passed into and constitutes the influx to the second resin filled compartment. In order to maintain electrical continuity between the anode and the cathode, the flushing compartment is adapted to contain a liquid, such as water, into which ions from both adjacent resin filled compartments can migrate, the flushing compartment therefore including ingress and exit means for flowing water therethrough in order to remove substantial concentrations of the latter ions.

The apparatus of the invention is particularly efficient in maintaining a high level of ion-exchange-resin bed regeneration during demineralization operation.

Referring now to the drawing, there is shown a side elevational, schematic sectional view of one embodiment of the invention which comprises a substantially hollow container 20 formed of a material which is relatively chemically inert to the solution intended to be contained therein or passed therethrough and which also possesses a relatively high electrical resistance in order to prevent short circuiting between the cathode and the anode. Some appropriate materials are polymeric plastics such as polytetrafluorethylene and polyvinyl chloride, substantially natural substances such as hard rubber, and the like. Container 20 is separated into a plurality of compartments or chambers, the two end compartments being respectively cathode compartment 22 and anode compartment 24. Compartment 22 has disposed therein a negative electrode or cathode 26 formed from a material selected for durability in the presence of the liquid in which it is to be immersed. It is apparent that a considerable number of materials may be employed in view of the wide variety of liquids described hereinafter which constitute the catholyte. Examples of some materials are platinum, platinized titanium, silver, copper, nickel, carbon, and the like. Cathode chamber 22 is preferably filled so that cathode 26 is completely immersed in a liquid catholyte 28 which constitutes a source of anions, preferably hydroxyl ions. Typical examples of suitable catholytes are solutions of KOH and NaOH. Means, of course, can be provided for supplying additional polar solvent, such as water, or additional catholyte to chamber 22 in the event of fluid loss from the latter, for example, by evaporation.

Chamber 24 has disposed therein a positive electrode or anode 30 also formed of a suitable material in view of the anolyte in which it is intended to be immersed. Chamber 24 contains liquid 32 in which the anode is immersed and which provides a ready source of cations such as hydrogen ions. For instance, a suitable anolyte is a solution of sulfuric acid. Again, means can be provided for maintaining the anolyte at the proper liquid level. It should be pointed out that both the anolyte and catholyte should not only be selected as ion sources with their conductivity, availability and expense in mind, but they should both be compatible with the ion-permselective type of membrane with which they are intended to be in contact. For instance, certain acids and bases are respectively known to have deleterious effect upon cation and anion exchange membranes, and the length of time which the membrane can be expected to remain operative is dependent upon the nature of the acid or base and the particular concentration in which the acid or base is employed.

Disposed immediately adjacent anode chamber 24 is chamber 36 which, in the form shown, is completely separated from chamber 24 by cation permselective membrane 38. Chamber 36 contains therein a bed or filler 40 comprising cation-exchange material. In the embodiment shown, filler 40 is in the form of a bed of granular or fibrous elements of commercially available and well-known cation-exchange material such as Amberlite IR-100, Amberlite IR-105, Amberlite IR-120, Dowex 30, Dowex 50, Permutit 216 and many others. Chamber 36 is provided with means, such as conduit 42, through which a solution intended to be demineralized is introduced into the cation-exchange bed. Means such as conduit 44 are also provided at an opposite end of chamber 36 from conduit 42 to allow withdrawal of solution from the chamber after passage of the latter through bed 40.

Disposed immediately adjacent cathode compartment 22 and completely separated therefrom by a partition in the form of an anion permselective membrane 46 is another compartment or chamber 48 filled with an anion-exchange resin material 50, the latter may be any of the known and commercially available anion-exchange resins such as Amberlite IRA–400, Amberlite IRA–410, Dowex 1, Duolite A–3, and many others. Again the resin material 50 may be in the form of beads or granules which fill the interior of compartment 48 to form a bed therein. Means such as conduit 52 are provided at one end of chamber 48 to permit ingress into the latter of solution intended to be treated therein. Similarly, means such as conduit 54 are provided, for instance, at the opposite end of chamber 48 from conduit 52 to provide an exit for effluent solution after the latter has passed through bed 50. As shown in the drawing, connecting means such as conduit or pipe 56 are provided for coupling the exit conducit 44 of the bed of cation exchange resin with the inlet conduit 52 to the bed of anion-exchange resin so that the effluent of the former constitutes the influx to the latter. Hence, it will be apparent that when the solution intended to be treated for demineralization is introduced into the cation-exchange bed, it is passed therethrough and thence into the anion-exchange bed so that the solution may be treated for the removal of both cations and anions by ion-exchange methods. Alternatively, the solution can first be introduced into an anion-exchange bed and thence to the cation-exchange bed, thereby removing the ions in an opposite order.

Disposed between chambers 36 and 48 is a flushing or wash chamber 58. The latter is separated from chamber 36 and the cation-exchange bed therein by a partition in the form of cation permselective membrane 60 so that there is no communication other than by ion migration through the membrane between chambers 36 and 58. Similarly, chamber 58 is separated from chamber 48 by a partition such as anion permselective membrane 62, the latter of course barring communication between the two chambers except in the form of selective ion migration. Means such as pipes 64 and 66 are provided at opposite ends of chamber 58 to allow respectively inlet and exit vents to chamber 58 through which a flushing solution or water is intended to be passed.

Referring to membranes 38 and 60, and 46 and 62, there are many commercially available ion-permselective membranes which may be employed. For instance, the manufacture and the nature of cation-permselective membranes is disclosed in U.S. Pat. Nos. 2,731,411; 2,702,272; and 2,731,408. Similarly, the manufacture of certain anion-selective membranes is disclosed in U.S. Pat. Nos. 2,800,445; 2,730,768; and 2,860,097.

Both the cation-exchange resin material 40 and the anion-exchange resin 50 are fitted or packed respectively into chambers 36 and 48 either in the form of dry granules or in a form wetted by a concentrated ionic solution. In either event, when the exchange resins are then exposed to solutions of lower ionic concentration as by passage of solution to be demineralized through the bed, the resin granules expand and may exert sufficient force against the confining permselective membranes to rupture the latter. Hence, the membranes may be suitably reinforced by macroporous support structures which are not shown. Because of space or design limitations, as for instance as shown in the drawing, it may be necessary to introduce the feed solution into chamber 36 under a head of pressure to ensure that the solution will continuously flow through both beds of ion-exchange resins. Alternatively means, such as a pump, may be inserted in pipe 56 to accomplish the same end.

In operation, chamber 24 is filled with a source of ions such as hydrogen ions, the latter being provided by a solution of sulfuric acid in a polar solvent such as water. Similarly the cathode compartment 22 is filled with a source of hydroxyl ions, such as an aqueous sodium hydroxide solution. A flow of solution intended to be demineralized is introduced into conduit 42. A polar solvent such as water is provided preferably in a continuous flow into chamber 58 through inlet pipe 64 passing through the chamber and being vented through exit pipe 66.

The passage of the feed solution first through the cation-exchange resin bed results substantially in deionization of the solution with respect to the exchange of its cations by hydrogen ions available from the resin. When the feed solution in which the cations have been exchanged for hydrogen ions leaves the cation-exchange bed, it is passed through connecting pipe 56 and introduced into the anion-exchange resin bed wherein it is further deionized by ion exchange of its anions by hydroxyl ions available from the resin. The demineralized effluent solution is thence passed outward of the apparatus through exit conduit 54. Continued passage of the feed solution through the exchange resin beds will ultimately exhaust the resins and the latter must be regenerated if it is desired to continue demineralization of the feed solution.

The present invention proposes to regenerate the beds electrolytically by impressing an appropriate direct current across electrodes 30 and 26 during the demineralization of the feed solution. Hydroxyl ions are generated at the cathode and under the potential gradient across the electrodes they migrate through membrane 46 and into exchange resin 50 displacing the anions that are absorbed from the feed solution. These anions again under the potential gradient across the electrode, pass through membrane 62 and into the wash water traversing compartment 58. In like manner at anode 30, hydrogen ions will be produced which can flow through membrane 38 and into the cation-exchange resin in chamber 36 wherein they replace the cations absorbed from the feed solution, thereby regenerating the cation-exchange resin. The replaced anions, under the potential gradient of the electrodes, migrate through membrane 60 and into the wash water flowing through compartment 58.

Typically, consider a feed solution into conduit 42 which contains, in low concentrations, such salts as $CaCl_2$, $CaSO_4$, $Na_2SO_4$, NaCl, $MgSO_4$, and others. The cation-exchange resin removes the cations of these salts replacing them with hydrogen ions so that the effluent from chamber 36 contains the acids of the salts. Hydrogen ions produced at the anode from anolyte 32 pass through membrane 38 replacing the cations removed from the feed solution and the latter migrate through membrane 60 and into wash water in compartment 58. When the acid effluent of chamber 36 is passed into chamber 48, the anions are removed therefrom and replaced with hydroxyl ions by the action of the anion-exchange resin in compartment 48. The demineralized water is passed to use through exit conduit 54. Hydroxyl ions produced at cathode 26 from catholyte 28, migrating through membrane 46, replace the anions removed from the feed solution and the latter are passed through membrane 62 into the wash water in compartment 58. It will be apparent that the wash effluent from compartment 58 will then contain these salts in solution which were originally present in the feed solution first introduced into compartment 36 while the ion exchange capacity of the resin in the beds in compartments 36 and 48 remains high.

It is also apparent, that while the drawing discloses but two dissimilar beds, that a number of such compartments containing dissimilar beds can be placed between two or more electrodes while each pair of compartments having dissimilar beds is provided with a flushing chamber between the two.

It is also apparent that there is a wide choice of membrane materials, ion-exchange resins and electrolytes, all of which should be so selected with reference to one another that proper demineralization results.

That the voltages employed to effect substantial regeneration of the beds, and that the regeneration of the beds is quite efficient, will be seen from the following example.

Into the apparatus of the figure is placed an anolyte of 0.1 N $H_2SO_4$ and a catholyte of 0.1 N NaOH. The cation-exchange resin is Dowex 50W (a strong acid resin of sulfonated styrene-divinyl benzene) enclosed between cation-permselective membranes of Nepton CR61 (sulfonated polystyrene membrane) constituting 210 sq. cm. of membrane area. The anion-exchange resin of Dowex 1 (a basic resin of quaternary ammonium type structure) is enclosed between anion-permselective membranes of Nepton AR111 (a quaternary ammonium type structure based on a cross-linked vinyl polymer) of like area, both membranes being commercially available from Ionics, Incorporated, Massachusetts, and both resins being commercially available from Dow Chemical Company, Michigan. A solution intended to be demineralized is introduced into the cation-exchange resin, the solution being 0.085 N NaCl. The effluent from the cation-exchange bed is led into one end of the bed of anion-exchange resin and the product removed from the other end.

Without any impressed current and with continuous flow of the solution (50 ml./min.) through the beds for two hours, the beds will be found to be exhausted, the salt concentration of the input solution being the same at the final product. By impressing a current of 12 amperes at 10–20 volts across the beds with the same flow of solution, it is found at the end of two hours that the final product is approximately 0.0085 N NaCl, indicating about a 90% removal and excellent regeneration of the resins. The effluent from the flushing chamber at that time is found to be approximately 0.161 N NaCl when a flushing rate of 50 ml./min. is employed and the initial flushing solution is also 0.085 N NaCl.

Since certain changes may be made in the above process and apparatus without departing from the scope of the invention herein involved, it is intended that all matter contained in the above description as shown in the accompanying drawing shall be interpreted as illustrative and not in a limiting sense.

I claim:

1. A five-compartmented apparatus for the treatment of fluids comprising in combination, a plurality of serially disposed compartments including a first compartment having a cathode electrode disposed therein, a second compartment immediately adjacent said first compartment and separated therefrom by an anion-permselective membrane, a bed of anion-exchange material disposed within said second compartment, a third compartment immediately adjacent said second compartment and separated therefrom by an anion-permselective membrane, a fourth compartment immediately adjacent said third compartment and separated therefrom by a cation-permselective membrane, a bed of cation-exchange material disposed within said fourth compartment, a fifth compartment immediately adjacent said fourth compartment and separated therefrom by a cation-permselective membrane, said fifth compartment having an anode electrode disposed therein, means for introducing and removing fluid from said second and fourth compartments, means for flowing a solution into said third compartment and means for impressing a direct electric current across said cathode and said anode whereby said ion-exchange resins are continuously regenerated from ions migrating from said electrode compartments.

2. An apparatus according to claim 1 further including means for transferring fluid between said second and fourth compartments.

3. An apparatus according to claim 2 characterized in that said third compartment contains means adapted for continuously passing a flushing solution therethrough.

4. An apparatus according to claim 2 characterized in that said fluid transfer means between said second and fourth compartments contain means for passing the effluent fluid from said second compartment as the influent fluid to said fourth compartment.

5. An apparatus according to claim 2 characterized in that said fluid transfer means between said second and fourth compartments contain means for passing the effluent fluid from said fourth compartment as the influent to said second compartment.

References Cited

UNITED STATES PATENTS

| | | | |
|---|---|---|---|
| 2,788,319 | 4/1957 | Pearson | 204—151 |
| 2,812,300 | 11/1957 | Pearson | 204—151 |
| 2,815,320 | 12/1957 | Kollsman | 204—180 P |
| 2,923,674 | 2/1960 | Kressman | 204—180 P |
| 3,014,855 | 12/1961 | Kressman | 204—180 P |
| 3,251,764 | 5/1966 | Miller et al. | 204—301 |
| 3,493,488 | 2/1970 | Sisk | 204—301 |
| 2,980,598 | 4/1961 | Stoddard | 204—180 B |

FOREIGN PATENTS

| | | | |
|---|---|---|---|
| 815,154 | 6/1959 | Great Britain | 204—180 B |
| 646,601 | 8/1962 | Canada | 204—180 B |

JOHN H. MACK, Primary Examiner

A. C. PRESCOTT, Assistant Examiner

U.S. Cl. X.R.

204—180 B